US012384518B2

(12) United States Patent
Family

(10) Patent No.: US 12,384,518 B2
(45) Date of Patent: Aug. 12, 2025

(54) FLIGHT CONTROL SURFACE WITH LEADING EDGE DEVICE WITHIN WING

(71) Applicant: AIRBUS OPERATIONS LIMITED, Bristol (GB)

(72) Inventor: Oliver Family, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 18/472,440

(22) Filed: Sep. 22, 2023

(65) Prior Publication Data

US 2024/0101248 A1 Mar. 28, 2024

(30) Foreign Application Priority Data

Sep. 23, 2022 (GB) ...................................... 2213903

(51) Int. Cl.
*B64C 9/24* (2006.01)
*B64C 9/32* (2006.01)
*B64C 13/38* (2006.01)

(52) U.S. Cl.
CPC ................ *B64C 9/24* (2013.01); *B64C 13/38* (2013.01); *B64C 9/323* (2013.01)

(58) Field of Classification Search
CPC .... B64C 9/22; B64C 9/24; B64C 9/26; B64C 9/32; B64C 9/323; B64C 9/34; B64C 23/076; B64C 2009/005
See application file for complete search history.

(56) References Cited

U.S. PATENT DOCUMENTS 1,631,259 A 6/1927 Gilmore
1,818,322 A 8/1931 Hall
2,166,292 A 7/1939 Hall
2,381,680 A 8/1945 Maxwell
3,282,535 A 11/1966 Steiner (Continued)

FOREIGN PATENT DOCUMENTS

GB 196949 A 5/1923
GB 2572216 A * 9/2019 ............... B64C 9/06

OTHER PUBLICATIONS

EP Search Report for Application No. 23196682.1, six pages, dated Feb. 7, 2024.

(Continued)

*Primary Examiner* — Arfan Y. Sinaki
(74) *Attorney, Agent, or Firm* — Nixon & Vanderhye P.C.

(57) ABSTRACT

An aircraft wing with a moveable leading edge device mounted towards the leading edge of the wing is disclosed. The leading edge device is moveable between a first configuration and a second configuration. In the first configuration, the leading edge device is substantially flush with the low pressure surface. In the second configuration, the surface of the leading edge device is retracted into the wing profile. The second configuration creates a void in the lower surface of the wing which modifies the airflow over the surfaces. The oncoming airflow can enter the void. In the second configuration, the leading edge device reduces the lift on the wing, acting to reduce the lift induced strain on the wing during high speed flight or to help manoeuvre the wing. The leading edge device may also be configured to move into a third configuration.

13 Claims, 5 Drawing Sheets

(56) References Cited

U.S. PATENT DOCUMENTS

| | | | | |
|---|---|---|---|---|
| 4,544,117 | A * | 10/1985 | Schuster | B64C 9/24 244/210 |
| 5,598,990 | A | 2/1997 | Farokhi et al. | |
| 2004/0079835 | A1* | 4/2004 | Volk | B64C 9/22 244/76 C |
| 2008/0029648 | A1 | 2/2008 | Giamati | |
| 2013/0228655 | A1* | 9/2013 | Burgunder | B64C 9/14 244/214 |
| 2016/0137290 | A1 | 5/2016 | Emerick | |
| 2018/0099737 | A1 | 4/2018 | Wright | |
| 2018/0305019 | A1* | 10/2018 | Hubschwerlen | B64C 21/02 |

OTHER PUBLICATIONS

Combined Search Report and Examination Report for GB2213903.4 dated Mar. 2, 2023, 6 pages.

* cited by examiner

FLIGHT CONTROL SURFACE WITH LEADING EDGE DEVICE WITHIN WING

CROSS RELATED APPLICATION

This application claims priority to United Kingdom Patent Application GB 2213903.4, filed Sep. 23, 2022, the entire contents of which is hereby incorporated by reference.

FIELD OF THE INVENTION

The present invention relates to an aircraft wing with a moveable leading edge device and a method of moving a moveable leading edge device on a wing.

BACKGROUND OF THE INVENTION

An aircraft wing will have a combination of flight control surfaces arranged on the leading edge (e.g. slats, trailing edge (flaps) or surfaces of the wings. These flight control surfaces primarily act by being actuated to protrude from the wing and alter the airflow around the wings.

The flight control surfaces act as lift generating devices, lift dumping devices, and/or are used to control the movement of the aircraft during flight, e.g. roll, yaw, pitch control. The devices are typically actuated by actuation systems that are connected to a central control system.

Depending on the size of the wing, the deployment and arrangement of the mechanisms may be complex and occupy large volumes of space within the wing. In some circumstances, e.g. space constraints, it is desirable to reduce the complexity of the flight control surfaces without significantly impacting their functionality.

SUMMARY OF THE INVENTION

According to an aspect of the present invention, there is provided an aircraft wing comprising a leading edge, a trailing edge, an upper surface extending between the leading edge and the trailing edge and a lower surface extending between the leading edge and the trailing edge to define a wing profile, and a moveable leading edge device mounted towards the leading edge, wherein the leading edge device is movable between: a first configuration in which a surface of the device is generally flush with the lower surface near the leading edge; and a second configuration in which the surface of the device is retracted inside the wing profile creating a void in the lower surface near the leading edge into which oncoming airflow can enter when the wing is moved through the airflow impairing lift produced by the wing.

The moveable leading edge device is mounted closer to the leading edge of the wing than to the trailing edge. The leading edge device may be immediately adjacent to the leading edge of the wing.

In the second configuration, the device may be retracted inside the wing profile creating a cavity and the oncoming airflow enters the cavity through the void in the lower surface near the leading edge.

The void is an absence of material in the wing profile. The oncoming airflow is disrupted as it travels around the wing profile as it enters the cavity through the void.

The cavity may have a rear wall with a height, and the device surface may have a length between a leading and a trailing edge thereof, and the height of the cavity rear wall may be at least one half of the length of the device surface.

The leading edge device may be rotatably mounted with respect to the leading edge.

Rotatably mounted means that the leading edge device can rotate relative to the leading edge of the wing.

The leading edge device may be rotatably mounted at one end thereof nearest the leading edge.

The leading edge device may be arranged to perform simple rotation about a hinge.

The leading edge device may rotate through an angle of at least 20 degrees when moving between the first configuration and the second configuration.

The leading edge device may be further movable to a third configuration in which the surface of the device is extended away from the wing profile and into the oncoming airflow when the wing is moved through the airflow increasing lift produced by the wing.

The wing may have a chord and the leading edge device surface may be oriented approximately perpendicular to the chord when in the third configuration.

This ensures that a large surface area of the leading edge device is used to contact and disrupt the oncoming airflow.

The aircraft wing may further comprise an actuator coupled to the leading edge device for moving the leading edge device between the configurations.

The leading edge device may comprise a panel.

The panel may be generally rectangular in planform and therefore easy to manufacture and install.

The aircraft wing may further comprise a front spar and wherein the leading edge device is located between the leading edge and the front spar.

The wing may have a root end and a tip end, and wherein the leading edge device is located adjacent the tip end.

The wing may have a wing tip device and the leading edge device may be located on the wing tip device.

The wing may have a span between a root end and a tip end thereof and defining a spanwise direction, and the wing may have no other movable flight control surfaces overlapping in the spanwise direction at the location of the leading edge device.

A further aspect of the invention may include a method of operating an aircraft wing, the wing comprising a leading edge, a trailing edge, an upper surface extending between the leading edge and the trailing edge and a lower surface extending between the leading edge and the trailing edge to define a wing profile, and a moveable leading edge device mounted towards the leading edge, The method may comprise moving the leading edge device between: a first configuration in which a surface of the device is generally flush with the lower surface near the leading edge; and a second configuration in which the surface of the device is retracted inside the wing profile creating a void in the lower surface near the leading edge into which oncoming airflow enters when the wing is moved through the airflow impairing lift produced by the wing.

The second configuration may be adopted at high speed flight for load alleviation or roll control.

The method may further comprise moving the leading edge device to a third configuration in which the surface of the device is extended away from the wing profile and into the oncoming airflow when the wing is moved through the airflow increasing lift produced by the wing.

The third configuration may be adopted at low speed flight for improving a stall angle of attack of the wing.

The stall angle of attack is the angle of attack which the wing makes with the free stream flow where lift produced by the wing begins to decrease significantly. In the third configuration, the leading edge device increases the wing camber and the lift coefficient of the wing which increases the stall angle of attack.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
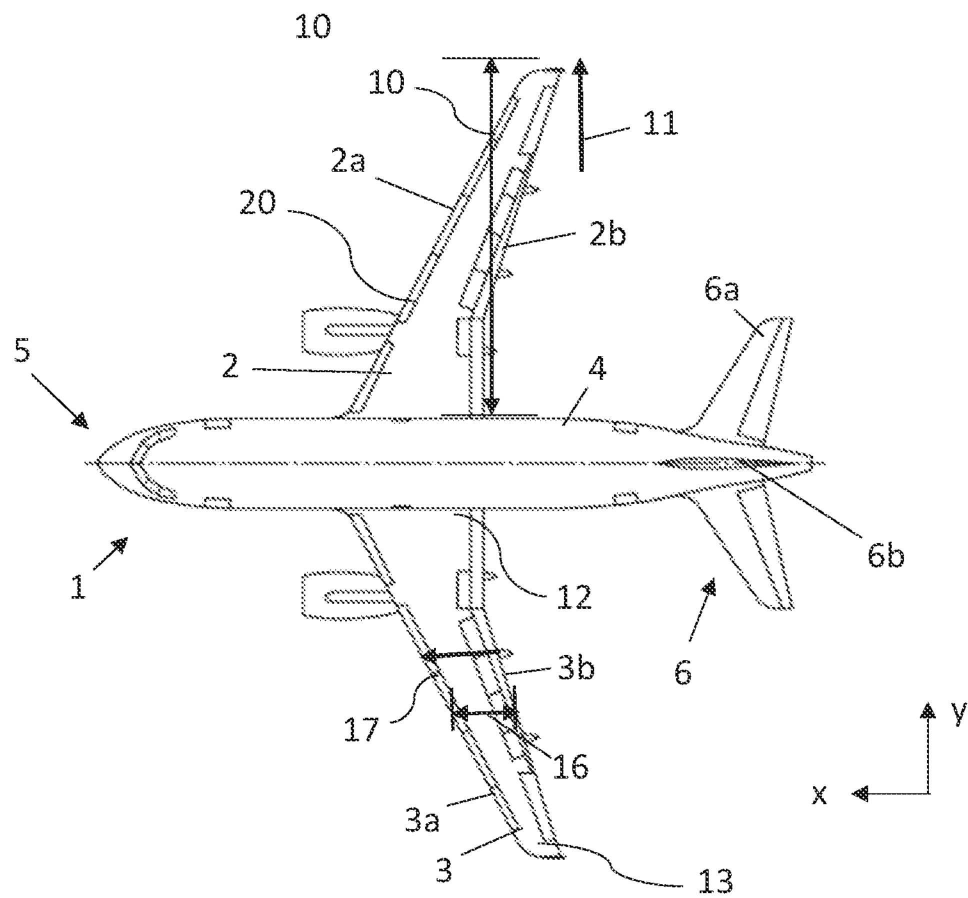
FIG. 1 shows an aircraft.

FIG. 1 shows an aircraft 1 with port and starboard fixed wings, 2, 3, a fuselage 4 and a nose end 5 and a tail end 6 including horizontal and vertical stabilising surfaces 6*a*, 6*b*. Each wing has a leading edge 2*a*, 3*a* and trailing edge, 2*b*, 3*b*. The aircraft 1 is a typical jet passenger transonic transport aircraft but the invention is applicable to a wide variety of fed wing aircraft types, including commercial, military, passenger, cargo, jet, propeller, general aviation etc.

Figure 2:
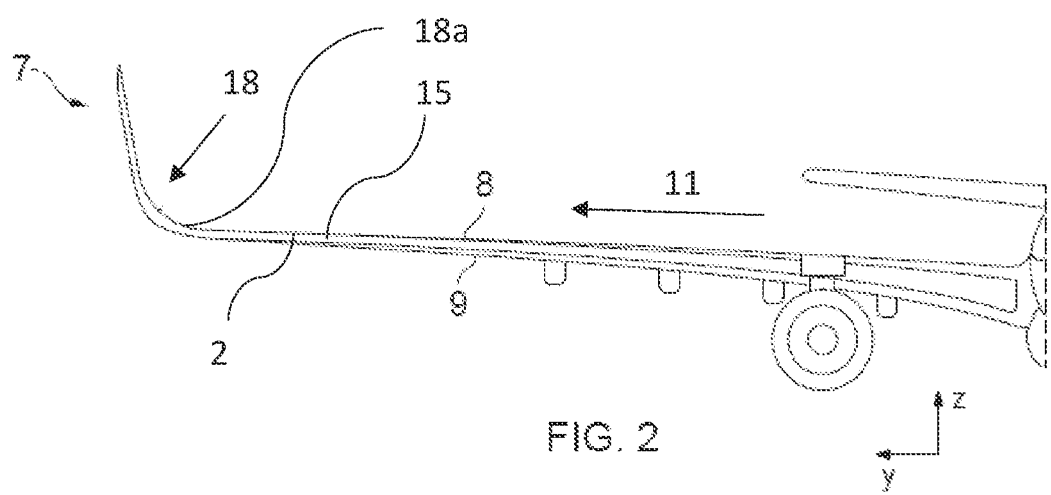
FIG. 2 shows a front view of an aircraft wing.

The axes shown in FIGS. 1 and 2 represent the usual reference orthogonal axes of the aircraft 1. The X-axis defines the longitudinal fore-aft direction of the aircraft; the Y-axis defines the spanwise direction and the Z-axis defines the vertical up-down direction of the aircraft.

Each wing 2,3 of the aircraft has a cantilevered structure with a length (i.e. span 10) extending in a spanwise 11 direction from a root 12 to a tip 13. The root 12 is joined to the aircraft fuselage 4. The wing portion near the root 12 is the inboard region. The wing portion near the tip 13 is called the outboard region. The wings 2,3 have a leading edge 2*a*, 3*a* and a trailing edge 2*b*, 3*b* respectively. The wings 2,3 also has a chord 16 extending in a chordwise direction 17 from a leading edge 2*a*,3*a* to a trailing edge 2*b*,3*b*.

FIG. 2 shows the front view of the wing 2 in greater detail. As shown, the wing 2 has an outer aerodynamic surface formed from an upper surface 8 and a lower surface 9. The upper surface 8 extends between the leading edge 2*a* and the trailing edge 2*b* on the upper side of the wing 2 and to the root 12 and the tip 13. Similarly, the lower surface 9 extends between the leading edge 2*a* and the trailing edge 2*b* on the lower side of the wing 2 and to the root 12 and the tip 13. The upper surface 8 and lower surface 9 define a wing profile 15.

At the tip end 13 of each wing 2,3 is a wing tip device 7 outboard of the main portion of the wing. The wing tip devices 7 are used to reduce the induced drag of the aircraft. Different aircraft have varying wing tip device 7 designs. Between the main portion of the wing and the wing tip device 7, there may exist a transition region 18. This transition region ensures that the aerodynamic profile between the wing 2 and the wing tip device 7 is maintained by smooth surface blending. The upper surface 8 of the transition region 18*a* is a smoothly upwardly curved surface. Alternatively, the wings 2,3 may have a different wing tip device 7 configuration.

The wings 2,3 are aft swept and have a number of aerodynamic flight control surfaces 20. There are a number of flight control surfaces, such as ailerons, elevator, rudders, spoilers, flaps, slats or air brakes. These are typically located on the wing 2,3 or on the horizontal stabiliser 6*a* or vertical stabiliser 6*b* of the aircraft 1.

Flight control surfaces 20 are adjustable during flight to adjust the aircraft flight altitude or wing performance by controlling the airflow over the wings 2,3. For example, ailerons may be used to tilt the wings 2,3 to control the roll of the aircraft, while leading edge devices (such as slats, flaps) may be used to increase the lift coefficient of the wings 2,3 at lower speed (such as take-off) or reduce the landing speed. The main leading-edge devices 20 are found on or towards the leading edge 2*a*, 3*a* of the aircraft wings 2,3.

Figure 3:
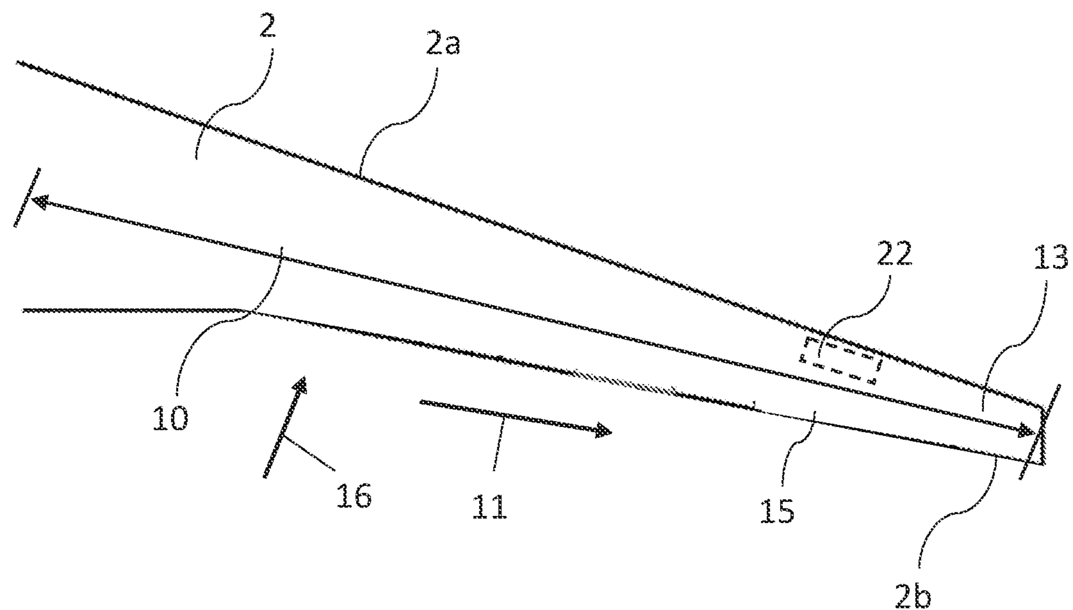
FIG. 3 shows a top of view of an aircraft wing.

A plan view of an exemplary wing 2 with an exemplary leading edge device 22 is shown in FIG. 3. The leading edge device 22 (shown schematically by the dotted lines in FIG. 3) is preferably located next to the tip end 13 of the wing 2. The tip end 13 of the wing 2 experiences the greater deflection and consequently bending and stress during flight compared to the inboard region 12. However, the leading edge device 22 may be positioned at any position along the length (span 10) of the wing 2. Alternatively, the leading edge device 22 may be located on the wing tip device 7, as shown schematically by the dotted lines in FIG. 4. As shown, the wing 2 has no other moveable flight control surfaces 20 overlapping in the spanwise direction 11 at the location of the leading edge device 22. This is advantageous because the leading edge device 22 is configured to have both high lift (lift generating) and lift dumping functions, described in greater detail below. This saves space in the wing 2 as one device (i.e. leading edge device 22) may be used for both functions instead of having two dedicated flight control surfaces 20.

Figure 5A:
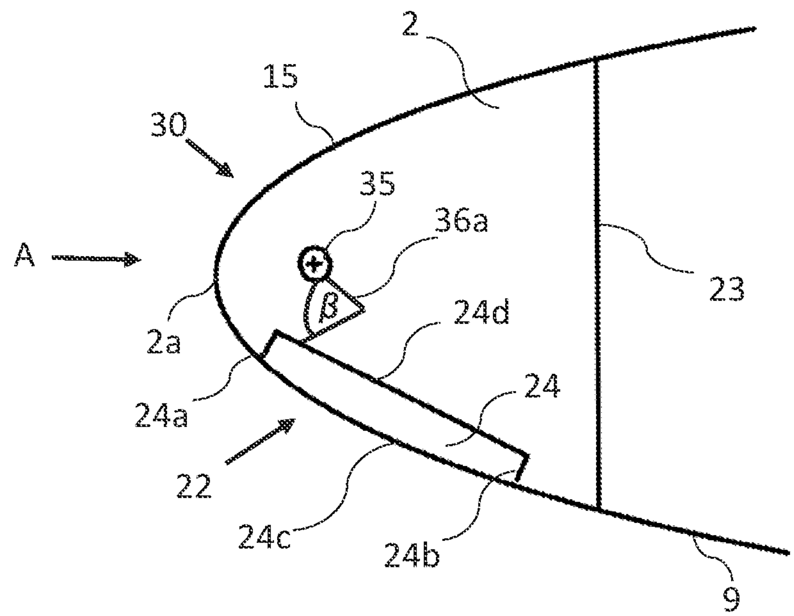
FIG. 5A shows a cross-section of a wing with an exemplary leading edge device in a first configuration.

FIG. 5A shows a cross-sectional view of the wing 2 with the exemplary leading edge device 22 shown in FIG. 3. The leading edge device 22 is mounted towards the leading edge 2*a*. The leading edge device 22 is therefore located nearer to the leading edge 2*a* than the trailing edge 2*b* (not shown in FIG. 5A) of the wing 2. As shown, the leading edge device 22 is located between the front spar 23 and the leading edge 2*a* of the wing 2.

Figure 4:
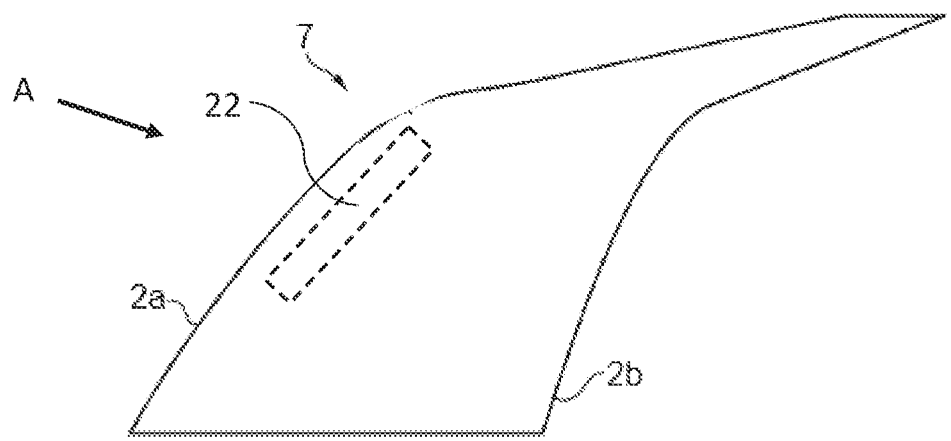
FIG. 4 shows a wing tip device.
Figure 6:
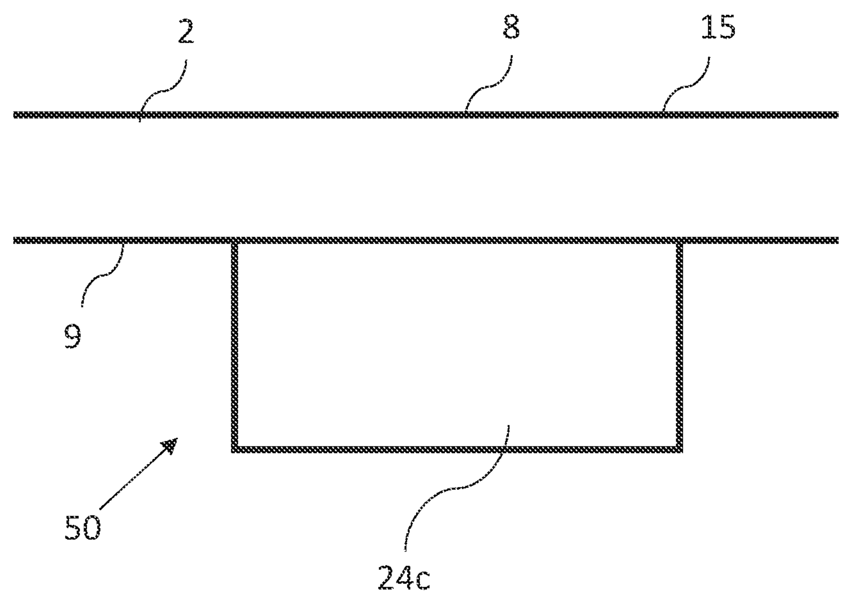
FIG. 6 shows a front view of an exemplary leading edge device in a third configuration.
Figure 7:
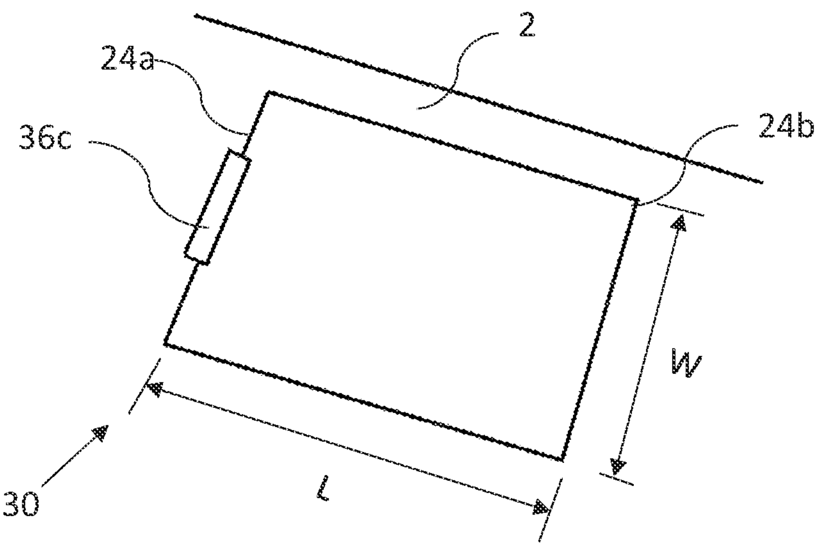
FIG. 7 shows a portion of the underside of the wing with a leading edge device in a first configuration.

The leading edge device 22 comprises a panel 24. In this example, the panel 24 is generally rectangular in planform, as shown in FIG. 6. The panel 24 has a length L in the spanwise direction 11, a width W in the chordwise direction 17, and a thickness T. The length L of the panel 24 is between the leading edge (i.e. the proximal edge 24*a*) and the trailing edge (i.e. the distal edge 24*b*). In this example, the length L of the panel is larger than the width W and the thickness T of the panel. The panel 24 is shown in FIG. 4 to have a curved profile in the thickness T dimension (to achieve a concave flow surface), but a linear length dimension L.

The panel 24 has a proximal end 24*a* (leading edge) and a distal bend 24*b* (trailing edge). The proximal end 22*a* is closer to the leading edge 2*a* of the wing 2, while the distal end 22*b* is closer to the trailing edge 2*b* of the wing 2. The panel 24 has an outward (aerodynamic) surface 24*c* and an inner (reverse) surface 24*d*.

The leading edge device 22 is shown in the first configuration 30 in FIG. 5A. In the first configuration 30, the leading edge device 22 is generally flush with the lower surface 9 of the wing 2. The outer surface 24*c* of the panel 24 has a shape that conforms to the local surrounding aerodynamic surface of the wing 2, i.e the lower surface 9 of the wing 2. The outer surface 24*c* of the panel 24 therefore contributes to an aerodynamic wing profile 15. As shown, the panel 24 does not extend past the lower surface 9 into the oncoming airflow A in the first configuration.

The leading edge device 22 is configured to move from the first configuration 30 to a second configuration 40. The leading edge device 22 may also be configured to be positioned into a third configuration 50, which will be described further detail in reference to FIGS. 5B and 5C below. The leading edge device 22 is configured to be moved between configurations via the actuator 35 (shown schematically in FIGS. 5A-5C). The inner surface 24*d* may be attached to an actuator 35 by any mechanical means, such as bolting. The actuator 35 however may be coupled to any part of the leading edge device 22, for example, at the proximal end 24*a* or the distal end 24*b* of the panel 24. The actuator 35 may be any suitable type of actuator, such as hydraulic or electric In the examples shown in FIGS. 5A-5C, the actuator 35 is coupled to the leading edge device 24 via linkages 36*a* and 36*b*. In the first configuration 30, the first linkage 36*a* is at an angle β relative to the second linkage 36*b*. The angle β is defined by the length and the orientation of the linkages 36*a*, 36*b*. The angle β may be any suitable angle that ensures the panel 24 is positioned flush against the lower surface 9 of the wing 2 in the first position 30. The angle β may also change depending on the position of the actuation system 35 within the wing 2.

Figure 5B:
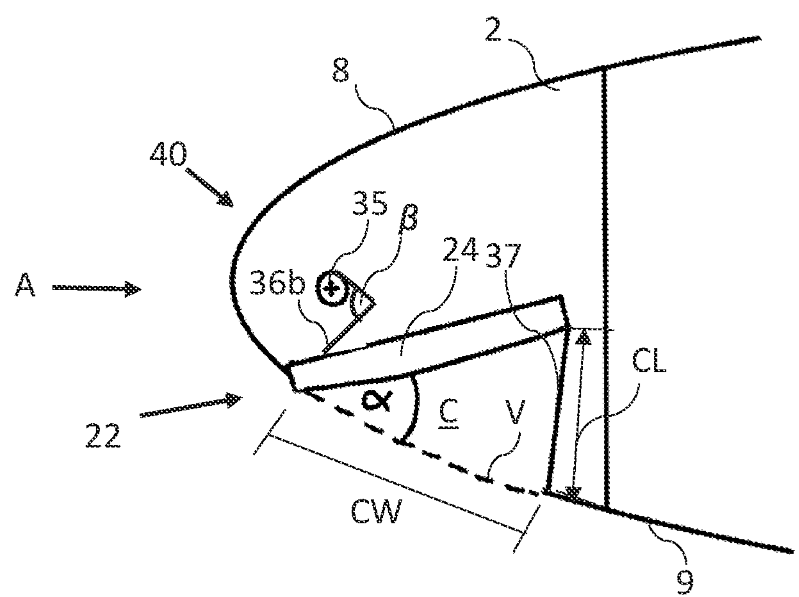
FIG. 5B shows a cross-section of a wing with an exemplary leading edge device in a second configuration.
Figure 5C:
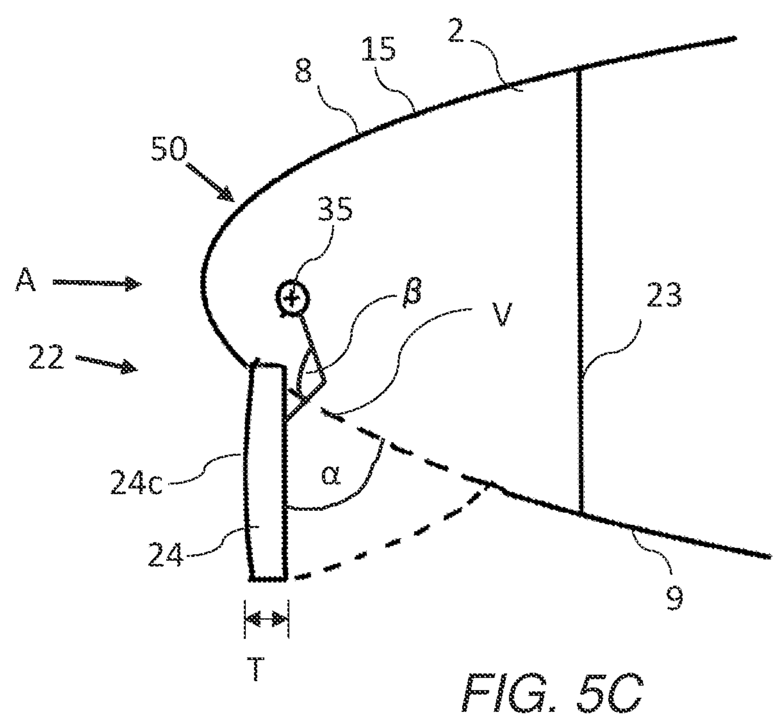
FIG. 5C shows a cross-section of a wing with an exemplary leading edge device in a third configuration.

FIG. 5B shows the leading edge device 22 rotating through an angle α between the first configuration 30 and the second configuration 40. As shown, the angle β decreases relative to the angle β in the first configuration 30 as the panel 24 is retracted into the wing 2. Conversely, FIG. 5C shows the leading edge device 22 in the third configuration 50. The angle β increases relative to the angle β in the first configuration as the panel 24 extends away from the wing 2. FIG. 5B shows the second configuration 40 of the leading-edge device 22. In the second configuration 40, the outer surface 24*c* of the leading edge device 22 is retracted inside the wing 2. The leading edge device 22 may be partially retracted into the wing 2 or fully retracted into the wing to create the void V in the lower surface 9. The void V is in the lower surface 9 near the leading edge 2*a*. The wing profile 15 is therefore no longer continuous when the leading edge device 22 is in the second configuration 40. The void V is an area of the lower surface 9 of the wing 2 that is empty when the panel 24 is moved into the second configuration 40. The shape of the void V therefore largely corresponds to the shape of the panel 24 of the leading edge device 22.

During flight, the oncoming airflow A may pass along the underside of the wing 2, along the lower surface 9 and into a cavity C via the void V. The cavity C is a volume of space within the wing 2. The cavity has a width CW in the chordwise direction 17, a length CL in the up-down direction Z and a depth in the spanwise direction (not shown). The length CL is defined by the rear wall 37. The cavity C is such that the length CL of the cavity rear wall 37 is at least one half of the length L of the leading device surface 22*c*. This ensures that the cavity C has a large enough volume to disrupt the oncoming airflow A by entering into the cavity C.

As shown, the trailing edge (i.e. the distal end 24*b*) of the panel 24 rotates towards the upper surface 8 and through the cavity C until the panel 24 is in the final position. In this example, the panel 24 rotates along the leading edge (i.e. the proximal end 24*a*) of the panel 24 to move from a first configuration 30 to a second configuration 40. The trailing edge 24*b* of the panel 24 is therefore unattached to the wing 2. This ensures that oncoming airflow A can easily travel into the cavity C, thus disrupting the oncoming airflow A. While the panel 24 is described to rotate along the leading edge, it will be understood that the panel 24 may be configured to rotate along any other suitable edge, the trailing edge (i.e. the distal end 24*b*) or any of the side edges of the panel. In these examples, any edge of the panel (such as the side edges, or trailing edge 24*b*) may be rotatably mounted to the wing 2, with the opposing edge unattached. The panel 24 therefore may be mounted in any suitable configuration to permit either simple inward rotation or kinematic rotation (as shown in FIGS. 5A-5C) into the wing 2. Preferably the leading edge device 22 is rotatably mounted by the end nearest the leading edge 2*a*.

The panel 24 moves between the first configuration 30 and the second configuration 40 through rotation. The leading edge device 22 may rotate through any suitable means, such as a linear actuator pushing/pulling the panel (as shown in FIGS. 5A-5C), or a screw jack mechanism. Preferably, the leading edge device 22 is configured to perform a simple rotation about a hinge 36C (shown in FIG. 8). In this example, the hinge 36C is arranged at the leading edge 24*a* of the panel. The hinge 36C is also arranged to be in connection with the actuator 35 (not shown), such that the actuator 35 may rotate the panel 24 from a first configuration 30 to a second configuration 40 through the hinge 36. When the hinge 36C is used, the panel 24 moves through simple rotation along an edge.

The leading edge device 22 rotates through an angle α when moving between the first configuration 30 and the second configuration 40. The angle α is defined by the original position of the panel 24 (i.e. flush against the lower surface 9 in the first configuration), and the final position of the panel 24 in the second configuration 40. Preferably, the angle α is at least 20 degrees. This ensures that the cavity C is large enough to disrupt the oncoming airflow. The leading edge device 22 may be rotated by an angle α greater than 20 degrees, for example, 30 degrees or 45 degrees.

This impairs the lift produced by the wing 2 by disrupting the flow over the lower surface 9 of the wing. This reduces the lift and increases the drag. The leading edge device 22 therefore decreases the lift of the local aerofoil section in the second configuration 40 and therefore reduces the lift in the outboard wing region 13 of the aircraft 1.

The second configuration 40 may also be used to control movement of the wing 2. For example, the second configuration 40 may be adopted at high speed flight for load alleviation or roll control.

The leading edge device 22 may also be configured to move into a third configuration 50, as shown in FIG. 5C. In the third configuration 50, the panel 24 rotates away from the wing 2 by an angle α into the oncoming airflow A. The panel 24 is configured to rotate using the same mechanism and orientation as described above in relation to the second configuration 40. Instead of rotating the panel 24 into the wing 2, instead, the panel 24 rotates away from the wing 2. More specifically, the actuator 35 acts on the leading edge device 22 to rotate the panel 24 around the hinge 36*c* into the oncoming airflow A.

The hinge 36*c* may be a device connected to the panel 24 and the lower surface 9 of the wing 2. The hinge 36*c* allows the panel 24 to rotate between the first configuration 30 and the second configuration 40, or to the third configuration 50. The hinge 36*c* therefore defines the line of rotation through which the panel 24 rotates around. In this example, the hinge 36*c* is located along the leading edge (i.e. the proximal end 24*a*) of the panel 24. This enables the panel 24 to perform a simple rotation along the leading edge 24*a*.

While the hinge 36*c* is described to be located on the leading edge 24*a* of the panel, it will be understood that the hinge 36*c* may be located along any other suitable edge, such as the trailing edge (i.e. the distal end 24*b*) or any of the side edges of the panel. Similarly, the hinge 36*c* may be any suitable size or configuration to enable the panel 24 to rotate.

FIG. 6 shows a front view of the wing 2 with the leading edge device in the third configuration. As shown, the leading edge device outer surface 24*c* is oriented approximately perpendicular to the chord 16.

As shown, the outer surface 24*c* of the panel 24 extends away from the wing profile 15 into the oncoming airflow A. The oncoming airflow A is subsequently deflected by the outer surface 24*c*. This ensures that panel 24 disrupts the oncoming airflow A effectively, as all of the outer surface 24*c* of the panel will contact the airflow A.

This alters the flow of air around the lower surface 9 of the wing 2. In this configuration, the leading edge device 22 increases the lift produced by the wing. The third configuration 50 may also be used to control the movement of the wing 2. For example, the third configuration 50 may be adopted at low-speed flight to improve the stall angle of attack of the wing 2. This helps prevent stalling of the aircraft 1 during specific manoeuvres, such as take-off.

As the wings 2,3 are similar in construction, the wing 3 will have similarly arranged leading edge device 22 for symmetry with the wing 2. While only one exemplary leading edge device 22 is described in relation to FIGS. 3A-5C, it will be understood that there may be multiple leading edge devices 22 arranged toward the leading edge 2*a* of the wing 2. Each leading-edge device 22 may be actuated independently by their respective actuation systems 35 or may be actuated into the second 40 or third configuration 50 in unison. Alternatively, each leading-edge device 22 may be actuated independently.

Figure 8:
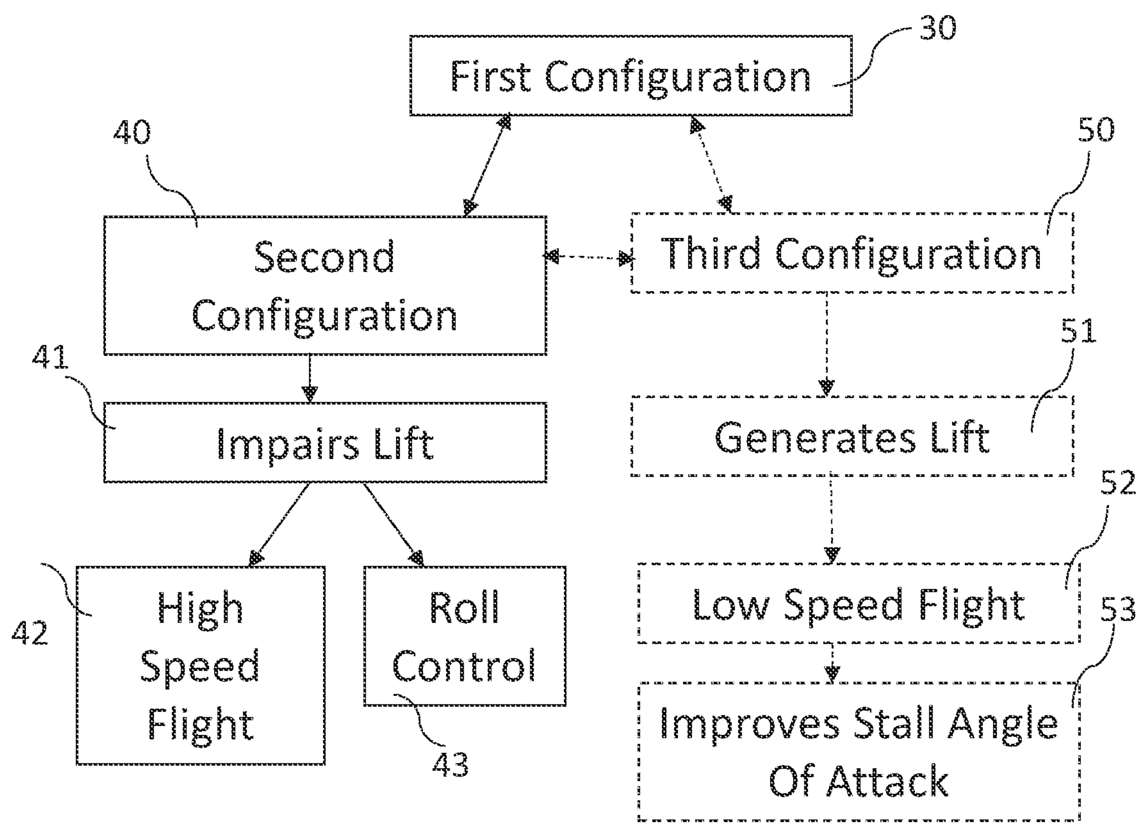
FIG. 8 shows a flow chart of the moveable leading edge device configurations.

FIG. 8 shows how the leading edge device 22 may be used and the associated function of the leading edge device 22. As shown, the leading edge device 22 may be configured to transition from the first configuration 30 to the second configuration 40. If the leading edge device 22 is configured to further move to a third configuration 50, then the device 22 may move from the first configuration 30 to the third configuration 50. The movement of the leading edge device 22 is controlled by the actuator 35, which may be controlled by any suitable control system within the aircraft 1.

The second configuration 40 may be adopted to impair the lift 41 of the wings 2,3 during high speed flight 42 or during roll control 42. If the leading edge device 22 is configured to move to the third configuration 50, then this may be used to generate lift 51 for low speed flight 52, which improves the stall angle of attack 53. However, these are only illustrative examples of use of the second configuration 40 and the third configuration 50—these configurations may be used at any time during flight as required to control and move the aircraft 1.

The leading edge device 22 describe provides lift dumping abilities through a simple mechanism, i.e. rotation about a hinge. This arrangement reduces any complicated actuation mechanisms that may be used in the wing to achieve similar results. This also reduces the overall weight and complexity of the aircraft design.

This arrangement can also be used in thin aerofoil sections, such as wing tip devices, where space constraints may prohibit the use of traditional actuator components. The described leading edge device 22 can also be used to control the large lever arm effect on wing loading and reduce the bending moments at the wing root 12. This results in a lighter construction of the wing design.

If the leading edge device 22 is configured to move between both the second configuration 40 and third configuration 50, it enables the leading edge device 22 to provide both lift generating and dumping capabilities. A single leading edge device 22 can therefore be used instead of using two dedicated flight control surface 20 on the wings 2,3.

This therefore reduces the space required in the wings 2,3 to accommodate the leading edge device 22 as only one device is required to achieve both functions. The leading edge device 22 can therefore be used to reduce the size of the wings 2,3, or be used in wings 2,3 with smaller space constraints and requirements.

Where the word or appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. An aircraft wing, comprising: a fixed wing, having:

a leading edge, a trailing edge, an upper surface extending between the leading edge and the trailing edge and a lower surface extending between the leading edge and the trailing edge to define a wing profile, and a moveable leading edge device mounted towards the leading edge, the leading edge device having a proximal end and a distal end, wherein the leading edge device is rotatably mounted at the proximal end thereof to the fixed wing, so as to be movable by rotation between:

a first configuration in which the proximal end is nearer the leading edge than the distal end, and in which a surface of the device is generally flush with the lower surface near the leading edge;

a second configuration in which the surface of the device is retracted inside the wing profile creating a void in the lower surface near the leading edge into which oncoming airflow can enter when the fixed wing is moved through the airflow impairing lift produced by the fixed wing; and, a third configuration in which the surface of the device is extended away from the wing profile and into the oncoming airflow when the fixed wing is moved through the airflow increasing lift produced by the fixed wing, the aircraft wing further comprising an actuator disposed within the wing profile and coupled to the leading edge device via first and second linkages, wherein the first and the second linkages are configured to move the leading edge device between the first, second, and third configurations.

2. The aircraft wing according to claim 1, wherein in the second configuration, the device is retracted inside the wing profile creating a cavity and the oncoming airflow enters the cavity through the void in the lower surface near the leading edge.

3. The aircraft wing according to claim 2, wherein the cavity has a rear wall with a height, and the device surface has a length between a leading and a trailing edge thereof, and the height of the cavity rear wall is at least one half of the length of the device surface.

4. The aircraft wing according to claim 1, wherein the leading edge device is arranged to perform rotation about a hinge.

5. The aircraft wing according to claim 1, wherein the leading edge device rotates through an angle of at least 20 degrees when moving between the first configuration and the second configuration.

6. The aircraft wing according to claim 1, wherein the fixed wing has a chord and the leading edge device surface is oriented perpendicular to the chord when in the third configuration.

7. The aircraft wing according to claim 1, wherein the leading edge device comprises a panel.

8. The aircraft wing according to claim 1, further comprising a front spar and wherein the leading edge device is located between the leading edge and the front spar.

9. The aircraft wing according to claim 1, wherein the fixed wing has a root end and a tip end, and wherein the leading edge device is located adjacent the tip end.

10. The aircraft wing according to claim 1, wherein the fixed wing has a wing tip device and the leading edge device is located on the wing tip device.

11. The aircraft wing according to claim 1, wherein the fixed wing has a span between a root end and a tip end thereof and defining a spanwise direction, and wherein the fixed wing has no other movable flight control surfaces overlapping in the spanwise direction at a location of the leading edge device.

12. A method of operating an aircraft wing, the wing comprising:

a fixed wing, having:

a leading edge, a trailing edge, an upper surface extending between the leading edge and the trailing edge and a lower surface extending between the leading edge and the trailing edge to define a wing profile, and a moveable leading edge device mounted towards the leading edge, the leading edge device having a proximal end and a distal end, wherein the leading edge device is rotatably mounted at the proximal end thereof to the fixed wing so as to be moveable by rotation, the method comprising:

moving the leading edge device between:

a first configuration in which the proximal end is nearer the leading edge than the distal end, and in which a surface of the device is generally flush with the lower surface near the leading edge;

a second configuration in which the surface of the device is retracted inside the wing profile creating a void in the lower surface near the leading edge into which oncoming airflow enters when the fixed wing is moved through the airflow impairing lift produced by the fixed wing;

a third configuration in which the surface of the device is extended away from the wing profile and into the oncoming airflow when the fixed wing is moved through the airflow increasing lift produced by the fixed wing; and, wherein the second configuration is adopted for load alleviation or roll control.

13. The method according to claim 12, wherein the third configuration is adopted for improving a stall angle of attack of the fixed wing.

* * * * *